(12) United States Patent
Daugaard et al.

(10) Patent No.: US 9,816,040 B2
(45) Date of Patent: Nov. 14, 2017

(54) INCREASING STABILITY OF A PYROLYSIS PRODUCT

(71) Applicants: Daren E. Daugaard, Skiatook, OK (US); Samuel T. Jones, Dewey, OK (US); Johnathan T. Gorke, Owasso, OK (US)

(72) Inventors: Daren E. Daugaard, Skiatook, OK (US); Samuel T. Jones, Dewey, OK (US); Johnathan T. Gorke, Owasso, OK (US)

(73) Assignee: Phillips 66 Company, Houston, TX (US)

(*) Notice: Subject to any disclaimer, the term of this patent is extended or adjusted under 35 U.S.C. 154(b) by 505 days.

(21) Appl. No.: 14/021,389

(22) Filed: Sep. 9, 2013

(65) Prior Publication Data

US 2014/0069797 A1 Mar. 13, 2014

Related U.S. Application Data

(60) Provisional application No. 61/699,036, filed on Sep. 10, 2012.

(51) Int. Cl.
*C10J 3/46* (2006.01)
*C10L 3/08* (2006.01)
(Continued)

(52) U.S. Cl.
CPC ............. *C10J 3/46* (2013.01); *C10B 43/14* (2013.01); *C10B 53/02* (2013.01); *C10B 53/08* (2013.01);
(Continued)

(58) Field of Classification Search
CPC ........................................ C10L 5/12
See application file for complete search history.

(56) References Cited

U.S. PATENT DOCUMENTS 4,398,476 A * 8/1983 Suzuki ............... C02F 11/10
110/225
4,773,919 A * 9/1988 Sauter ................. C10J 3/02
44/559

(Continued)

FOREIGN PATENT DOCUMENTS

WO 200134725 A1 5/2001
WO 2011159154 A1 12/2011
(Continued)

OTHER PUBLICATIONS

Brown, J.N. et al, "Process Optimization of an Auger Pyrolyzer with Heat Carrier Using Response Surface Methodology" Bioresource Technology, vol. 103(2012) pp. 405-414.
(Continued)

*Primary Examiner* — Matthew J Merkling
(74) *Attorney, Agent, or Firm* — Phillips 66 Company

(57) ABSTRACT

The present disclosure relates generally to novel biomass pyrolysis processes and systems that decrease entrainment of char and other contaminants with the pyrolysis vapors as a direct consequence of the biomass feedstock comprising particles that are larger than a defined minimum diameter. The biomass feedstock may optionally be compressed to form feedstock pellets that are larger than a defined minimum diameter.

1 Claim, 3 Drawing Sheets

(51) Int. Cl.
| | |
|---|---|
| C10B 43/14 | (2006.01) |
| C10B 53/02 | (2006.01) |
| C10B 53/08 | (2006.01) |
| C10B 57/06 | (2006.01) |
| C10G 1/08 | (2006.01) |
| C10B 49/16 | (2006.01) |
| C10G 2/00 | (2006.01) |

(52) U.S. Cl.
CPC ............... *C10B 57/06* (2013.01); *C10G 1/08* (2013.01); *C10G 2/32* (2013.01); *C10L 3/08* (2013.01); *C10B 49/16* (2013.01); *C10G 2300/1011* (2013.01); *Y02E 50/14* (2013.01); *Y02E 50/32* (2013.01); *Y02P 20/145* (2015.11); *Y02P 30/20* (2015.11)

(56) References Cited

U.S. PATENT DOCUMENTS

| | | | |
|---|---|---|---|
| 8,100,990 B2 | 1/2012 | Ellens et al. | |
| 2004/0111968 A1* | 6/2004 | Day | C05C 9/005 48/197 FM |
| 2010/0163395 A1* | 7/2010 | Henrich | C10L 349/16 201/2.5 |
| 2010/0228062 A1 | 9/2010 | Babicki et al. | |
| 2011/0167713 A1 | 7/2011 | Quignard et al. | |
| 2011/0213188 A1 | 9/2011 | Agblevor et al. | |
| 2012/0029252 A1 | 2/2012 | Lissianski et al. | |

FOREIGN PATENT DOCUMENTS

| | | |
|---|---|---|
| WO | 2012012684 A1 | 1/2012 |
| WO | 2012013735 A1 | 2/2012 |

OTHER PUBLICATIONS

Ringer, M. et al, "Large-Scale Pyrolysis Oil Production: A Technology Assessment and Economic Analysis" National Renewable Energy Laboratory/TP-510-37779; Nov. 2006; U.S. Dept. of Energy; Kansas City, Missouri, USA.

Singh, Kaushlendra, Value Added Products From Poultry Litter Using Fractionation, Pyrolysis, and Pelletizing; Ph.D. Dissertation; University of Georgia, 2008.

* cited by examiner

INCREASING STABILITY OF A PYROLYSIS PRODUCT

CROSS-REFERENCE TO RELATED APPLICATIONS

This application is a non-provisional application which claims benefit under 35 USC §119(e) and priority to U.S. Provisional Application Ser. No. 61/699,036 filed Sep. 10, 2012, entitled "INCREASING STABILITY OF A PYROLYSIS PRODUCT", which is hereby incorporated by reference herein.

STATEMENT REGARDING FEDERALLY SPONSORED RESEARCH OR DEVELOPMENT

None.

FIELD OF THE INVENTION

This invention relates to pyrolysis of organic matter into useful chemical or fuel products.

BACKGROUND

The U.S. Renewable Fuel Standards (RFS) mandate will require higher volumes of advanced biofuels to be produced in the near future. One method being developed to meet this mandate is the fast pyrolysis of biomass. Conventional biomass fast pyrolysis requires rapid heating of biomass in the absence of oxygen. Products include a solid carbonaceous char that contains the vast quantities of metals (e.g. Na, K, Mg) present in the biomass feedstock. The products also include a highly oxygenated pyrolysis oil (or pyoil) that is not practical for upgrading to a transportation fuel because of thermal stability issues associated with highly reactive oxygenated components. The remainder of the pyrolysis product is classified as non-condensable gas. To generate a viable transportation fuel, catalysts may be employed during the pyrolysis process. Catalysts such as zeolites can deoxygenate the primary products from pyrolysis to create an intermediate liquid that can be upgraded to a fuel using conventional refining methodology. Hydrogen may also be added to perform hydro-catalytic pyrolysis, which improves the quality of the product by significantly lowering the oxygen content, the acid content, etc. The use of hydrogen increases the yield of pyrolysis oil by hydrogenating the primary gaseous products, which removes oxygen as water instead of carbon oxides. The relatively low oxygen content intermediate produced is easily upgradeable to bio-derived fuels.

Unfortunately, when employing this process, the catalysts tend to rapidly deactivate when contacted by char fines composed of carbon and metals. Additionally, the char fines are often carried out of the pyrolyzer by entrainment with the pyrolysis vapor, resulting in a liquid product containing solids and metals that can negatively impact downstream processes.

There is a need to improve fast pyrolysis technology to allow for rapid catalytic upgrading of primary gaseous products into products that are fungible with current petroleum-derived liquid hydrocarbon fuels, while preventing char and associated metals from entrainment with these vapors to cause catalyst deactivation and equipment fouling, as well as increasing the instability of the product pyrolysis oil.

BRIEF SUMMARY OF THE DISCLOSURE

In certain embodiments of the present invention, there is provided a biomass pyrolysis process, comprising the steps of: (a) pyrolyzing a biomass feedstock in a reactor, wherein the pyrolyzing forms products comprising a primary gaseous product and char; (b) passing the primary gaseous product out of the reactor, where the primary gaseous product passing out of the reactor entrains less of the char (by wt.) as a direct consequence of the biomass feedstock comprising particles that are greater than 300 microns in diameter.

In certain embodiments, the primary gaseous product passing out of the reactor entrains less of the char (by wt.) as a direct consequence of the biomass feedstock comprising particles that are greater than 500 microns in diameter, optionally, greater than 750 microns in diameter. In certain embodiments, the particulate biomass feedstock is compressed prior to step (a) to form pellets that are greater than 300 microns in diameter. In certain embodiments, the feedstock may be compressed by techniques such as by pelletization or biomass briquetting.

In certain embodiments of the present invention, there is provided a biomass pyrolysis process, comprising the steps of: (a) providing a particulate biomass feedstock comprising particles equal to or smaller than 300 microns in diameter and compressing the feedstock to form pellets that are greater than 300 microns in diameter; (b) pyrolyzing the particulate biomass feedstock in a reactor, wherein the pyrolyzing forms products comprising a primary gaseous product and char; (c) passing the primary gaseous product out of the reactor, wherein the primary gaseous product passing out of the reactor entrains less of the char (by wt.) as a direct consequence of the biomass feedstock comprising pellets that are greater than 300 microns in diameter.

In certain embodiments, the particulate biomass feedstock comprises particles equal to or smaller than 500 microns in diameter, and the feedstock is compressed to form pellets that are greater than 500 microns in diameter, wherein the primary gaseous product passing out of the reactor entrains less of the char (by wt.) as a direct consequence of the biomass feedstock comprising pellets that are greater than 500 microns in diameter. In certain embodiments, the particulate biomass feedstock comprises particles equal to or smaller than 750 microns in diameter, and the feedstock is compressed to form pellets that are greater than 750 microns in diameter, where the primary gaseous product passing out of the reactor entrains less of the char (by wt.) as a direct consequence of the biomass feedstock comprising pellets that are greater than 750 microns in diameter.

In certain embodiments, the particulate biomass feedstock is compressed to form pellets that are greater than 300 microns in diameter, but less than 1250 microns in diameter. In certain alternative embodiments, the particulate biomass feedstock is compressed to form pellets that are greater than 500 microns in diameter, but less than 1250 microns in diameter. In certain embodiments, the particulate biomass feedstock is compressed to form pellets that are greater than 750 microns in diameter, but less than 1250 microns in diameter.

In certain embodiments, the primary gaseous product passing out of the reactor has a lower metal content as a direct consequence of the biomass feedstock comprising pellets that are greater than 300 microns in diameter. In certain alternative embodiments, the primary gaseous product passing out of the reactor has a lower metal content as a direct consequence of the biomass feedstock comprising pellets that are greater than 500 microns in diameter. In certain other alternative embodiments, the primary gaseous product passing out of the reactor has a lower metal content as a direct consequence of the biomass feedstock comprising pellets that are greater than 750 microns in diameter.

BRIEF DESCRIPTION OF THE DRAWINGS

A more complete understanding of the present invention and benefits thereof may be acquired by referring to the follow description taken in conjunction with the accompanying drawings in which.

Figure 1:
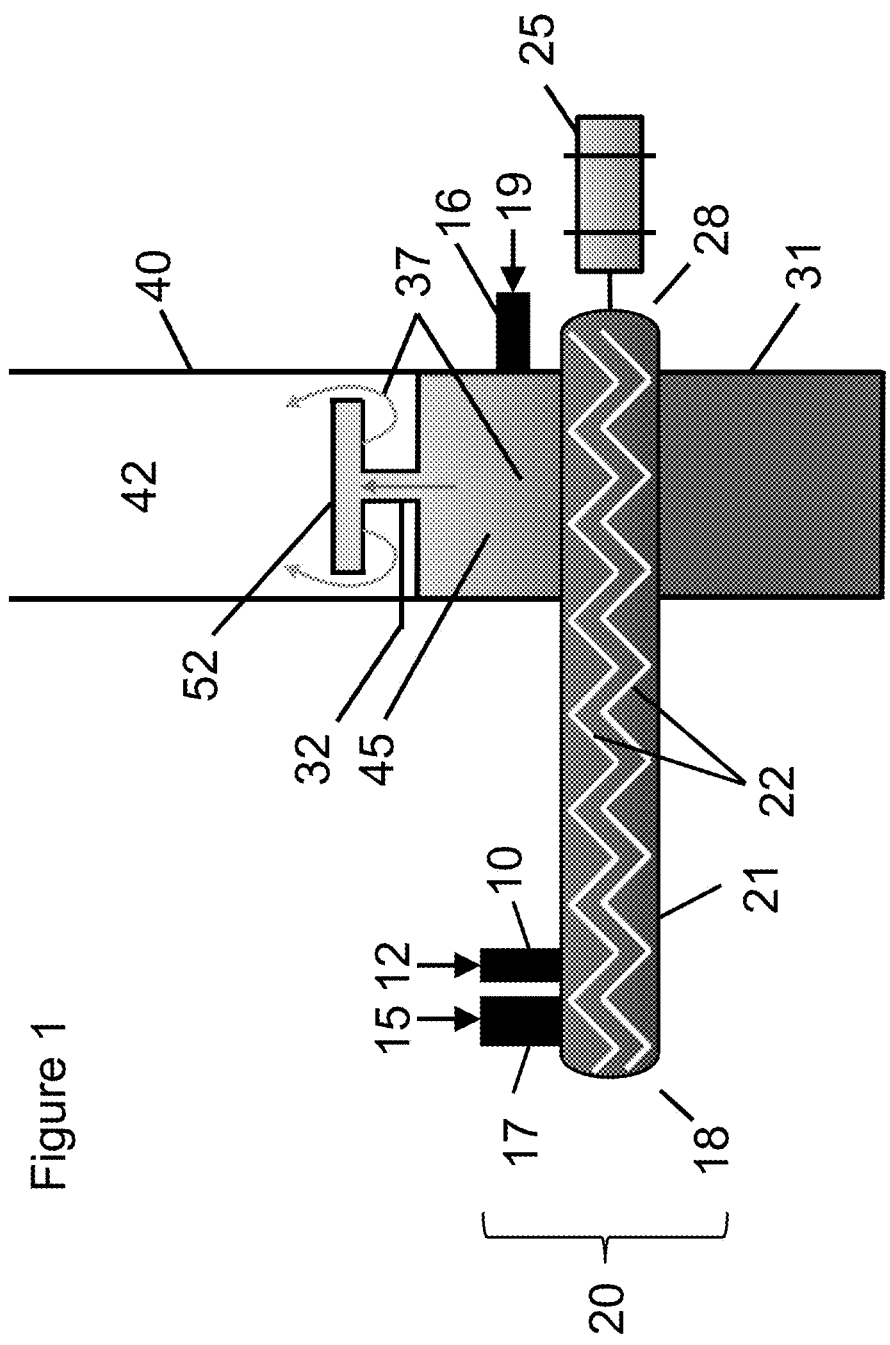
FIG. 1 is a simplified diagram of the inventive process depicting a pyrolysis reactor with a catalyst vessel to receive and upgrade the vapors from the pyrolysis reactor.

The invention is susceptible to various modifications and alternative forms, specific embodiments thereof are shown by way of example in the drawings. The drawings may not be to scale. It should be understood that the drawings and their accompanying detailed descriptions are not intended to limit the scope of the invention to the particular form disclosed, but rather, the intention is to cover all modifications, equivalents and alternatives falling within the spirit and scope of the present invention as defined by the appended claims.

DETAILED DESCRIPTION

In the processes and systems of the current invention, a biomass feedstock is fed to a pyrolysis reactor for conversion into a mixture comprising hydrocarbons that are fungible with petroleum-derived fuels that may include, but are not limited to, gasoline, jet-fuel, diesel and gasoil. The methods and systems described herein protect and extend the lifespan of the downstream upgrading catalyst(s) by preventing contact between the catalyst(s) and the char generated during pyrolysis of the biomass feedstock, while simultaneously minimizing the time between production of the pyrolysis vapors and subsequent upgrading, thereby maximizing upgradability of the vapors to fuels that are fungible with petroleum-derived transportation fuels.

The pyrolysis reactor preferably comprises at least one auger that assists in rapidly and evenly distributing heat to the feedstock, as well as helping to convey the feedstock through the pyrolysis reactor. Oxygenated hydrocarbon vapors are produced in the pyrolysis reactor, and these vapors are gravitationally separated from char, heat carrier, and metals in a disengagement zone while avoiding vapor condensation. The vapors are then rapidly contacted with an upgrading catalyst in at least one upgrading reactor comprising at least one upgrading catalyst for conversion of the vapors into a hydrocarbon mixture fungible with current petroleum-derived fuels. Residence time between production of pyrolysis vapors (i.e., the primary gaseous product) and contact with the one or more upgrading catalysts is minimized to prevent secondary pyrolysis reactions that decrease upgradability of the compounds that comprise the primary gaseous product.

The char created by the process described herein is conveyed through the reactor along with heat carrier by the at least one auger, then falls by force of gravity into a sealed char catch and is eliminated from the reactor. The pyrolysis vapors are swept through the pyrolysis reactor, out an outlet near the top of the reactor and immediately into an upgrading vessel containing at least one upgrading catalyst, which may hydrogenate and deoxygenate the pyrolysis products. The vessel may be operated as a fixed bed, fluid bed, or moving bed. Removing the char prior to contacting pyrolysis products with catalyst prevents catalyst fouling/poisoning. The products from the upgrading vessel are condensed or further upgraded, thereby generating a viable transportation fuel or refinable intermediate.

Examples of biomass feedstock used in the present invention include, but are not limited to, oil-containing biomass, such as jatropha plant, macroalgae or microalgae. Carbohydrate-based biomass may also be used as feedstock, where carbohydrate-based refers to biomass where at least a fraction of its composition is made of carbohydrates. Carbohydrate-based biomasses are available from a variety of sources including cellulosic biomass and algal biomass. Specific examples of feedstock useful in the current invention include, but are not limited to: sugars, carbohydrates, fatty acids, proteins, oils, eucalyptus oil, forest residues, dead trees, branches, leaves, tree stumps, yard clippings, wood chips, wood fiber, sugar beets, miscanthus, switchgrass, hemp, corn, corn fiber, poplar, willow, sorghum, sugarcane, palm oil, corn syrup, algal cultures, bacterial cultures, fermentation cultures, paper manufacturing waste, agricultural residues (e.g., corn stover, wheat straw and sugarcane bagasse), dedicated energy crops (e.g., poplar trees, switchgrass, and miscanthus giganteus sugarcane) sawmill and paper mill discards, food manufacturing waste, meat processing waste, animal waste, biological waste and/ or municipal sewage.

In conventional biomass pyrolysis, biomass feedstock is converted to particles that are typically less than 3 mm, although in conventional 'fast pyrolysis' an emphasis has been placed on converting the biomass feedstock to a particle size of less than 500 microns. This is done to allow more rapid heating of the feedstock particles during pyrolysis, and may minimize char formation. However, we have found that utilizing smaller feedstock particles, or fines, in the pyrolysis process also correlates directly with a higher level of metals in the product pyrolysis oil (refer to Example 1). Metal contamination is thought to contribute to the instability of pyrolysis oils by catalyzing numerous reactions that increase the viscosity of the oil and make further upgrading difficult. Example 1 shows that upon the pyrolysis of red oak, metals derived from the feedstock are largely retained in the solids fraction (Table 1). Example 1 also demonstrates that when the feedstock was sized to a particle diameter ranging from 300-500 microns (eliminating fines smaller than 300 microns), total metal content in the resulting pyrolysis oil fractions decreased by 94-97% relative to the content detected in the feedstock, while detected metal content was 16-fold higher in the solids fraction (comprising mostly char) versus the feedstock. Similarly, when the feedstock was sized to a particle diameter ranging from 750-1250 microns, total metal content detected in the resulting pyrolysis oil fractions decreased even further (95-99%) relative to the content found in the feedstock, while detected metal content was 8-fold higher in the solids fraction versus the feedstock While not wishing to be bound by theory, it is hypothesized that smaller feedstock particles lead to the formation of smaller char particles during pyrolysis. These smaller char particles are more easily entrained into the produced pyrolysis vapors and are difficult to separate from the pyrolysis vapors without implementing a mechanical step such as, for example, filtration or cyclone separation. If not removed prior to condensation of the vapors, the entrained char particles end up in the pyrolysis oil (accompanied by metals bound to the char) and catalyze reactions that decrease pyrolysis oil stability. By utilizing a feedstock that does not comprise smaller particles (or fines), the present invention decreases entrainment of char particles (measured by wt. %) in the primary gaseous product passing out of the reactor, and thereby also decreases the content of metals present in the produced pyrolysis oil. The present invention achieves this without any mechanical intervention or separation. An additional potential benefit is that the flow of pyrolysis vapors leaving the pyrolysis reactor may be increased without dramatically increasing entrainment of char particles. This could allow decreased residence times of the primary gaseous product prior to contacting an upgrading catalyst when the upgrading catalyst is housed in a separate reactor to prevent poisoning by contact with char and metals.

To achieve these benefits, certain embodiments disclosed herein utilize a biomass feedstock comprising particles that are greater than 200 microns in diameter. In certain alternative embodiments, a biomass feedstock is utilized comprising particles that are greater than 300 microns in diameter. In still other alternative embodiments, a biomass feedstock is utilized comprising particles that are greater than 500 microns in diameter. In still other alternative embodiments, a biomass feedstock is utilized comprising particles that are greater than 750 microns in diameter.

Fines produced during conversion of the feedstock to smaller particles may optionally be utilized in the process by compressing the fines into pellets larger than a minimum threshold diameter. Preferably, these pellets would be resistant to mechanical and thermal attrition following compression, to reduce entrainment of fine particulates in the primary gaseous product produced during pyrolysis of the feedstock.

FIG. 1 depicts an exemplary embodiment for a system for conducting pyrolysis of organic material or biomass to useful chemical products or fuel products. A pyrolysis reactor 20 comprises an external housing 21, a heat carrier inlet 17 for a heat carrier 15, an feedstock inlet 10 for a biomass feedstock 12 and one or more helical augers 22 that when driven by a motor 25 to rotate about a longitudinal axis convey the biomass feedstock 12 along the length of the housing 21 from an inlet end 18 towards an outlet end 28. Near the outlet end 28, the char falls into a char catch 31 by gravitational force. The biomass feedstock 12 is heated in the pyrolysis reactor 20 by at least one heating method that may include a heating jacket 21, a heated auger 22, or via introduction of a heat carrier 15 via a heat carrier inlet 17 proximal the inlet end 18 of the auger reactor 20. The pyrolysis reactor 20 is operated to exclude most oxygen or air by the introduction of a sweep gas. In the embodiment shown in FIG. 1, the sweep gas 19 enters through sweep gas inlet 16, although the sweep gas may alternatively enter the system via other points of entry, such as the biomass feedstock inlet 10 or heat carrier inlet 17. As the biomass feedstock 12 is rapidly heated, primary gaseous product 37 rise to the upper portion of the pyrolysis reactor 20 and are swept toward the second reactor end 28, exiting through a first outlet 32.

Arranged within close proximity of the pyrolysis reactor first outlet 32 is an upgrading reactor 40 containing at least one bed of an active upgrading catalyst 42. In certain embodiments, the pyrolysis reactor 20 is in direct contact with the upgrading reactor 40 with minimal distance between the pyrolysis reactor 20 and the upgrading catalyst 42. In the embodiment depicted in FIG. 1, a distributor plate 52 is placed above the outlet 32 to assist in retaining within the reactor 20 any residual particulates that may be entrained in the primary gaseous product (pyrolysis vapors) 37 leaving the reactor 20 through outlet 32. Distributor plate 52 may also serve to evenly distribute gases within the upgrading reactor 40, such as when the upgrading catalyst 42 contained within comprises, for example, a fluidized bed (not depicted).

When the pyrolysis reactor described herein comprises an auger, the reactor is more efficient in char removal than a conventional fluidized bed reactor, which produces char fines by attrition that elutriate into the vapor product stream. The majority of char formed during pyrolysis is conveyed by the auger 22 along with heat carrier 15 towards the outlet end 28 of the pyrolysis reactor 20. The majority of char and/or ash produced during pyrolysis of the feedstock exits the pyrolysis reactor 20 by force of gravity into char catch 31. Thus, the char is diverted from entering the upgrading reactor 40 and coming in contact with the upgrading catalyst bed 42, which dramatically enhances the longevity of the upgrading catalyst(s) 42. As noted above, it is common for the biomass feedstock 12 to include measurable amounts of metals that act as poisons to desirable upgrading catalysts, and we have found that this metal content becomes concentrated in the char produced during pyrolysis. With the physical arrangement described herein, catalyst that are more susceptible to poisoning by metals may be used to upgrade the pyrolysis vapors, since the impact of metal poisoning and coke formation is dramatically reduced. In addition, the product leaving the upgrading bed is free of solids and metals, thereby removing the need for subsequent particle removal The pyrolysis reactor preferably comprises at least one auger and may take many forms. In one embodiment, a single rotating auger transports sand, biomass and solid pyrolysis products through an elongated, cylindrical reactor. In the embodiment depicted in FIG. 1, two rotating augers 22 operate in parallel. The first pyrolysis product exits through a first outlet 32 located on the upper side of the auger pyrolyzer 20, preferably near the top of the reactor to prevent solids from leaving the reactor via this outlet. The outlet 32 conveys the primary gaseous product 37 immediately to contact an upgrading catalyst 42, which is optionally contained within an upgrading reactor 40.

The temperature within the pyrolysis reactor may be maintained via one or more of several mechanisms, such as heating of the reactor walls, heating of the at least one auger, microwave or inductive heating, addition of a heated sweep gas, and addition a of a solid particulate that has been pre-heated to a temperature of at least 900° F. (482° C.). Regardless of the heating mechanism utilized, preferably the pyrolysis reactor is maintained at a temperature of at least 600° F. (315° C.).

To reduce particle entrainment leading to heat carrier exiting the reactor via outlet 32, the median heat carrier particle size is greater than about 100 microns, and preferably greater than about 250 microns. For similar reasons, the bulk density of the heat carrier particles is at least 500 kg/m$^3$, and preferably greater than about 1,000 kg/m$^3$.

Conventional pyrolysis methods and systems have suffered from either 1) char carry over in the pyrolysis vapors, which leads to upgrading catalyst deactivation, or 2) use of mechanical separation devices to remove char from pyrolysis vapors, which results in an undesirable delay prior to catalytic upgrading. This delay can allow secondary pyrolysis reactions to occur that produce products comprising 16 or more carbons that are difficult to upgrade into a bio-derived fuel. Again referring to the embodiment depicted in FIG. 1, a "disengagement zone" 45 is located proximal to the out end 28 of the pyrolysis reactor, and near the first outlet 32. This zone is designed to provide a space where the upward local velocity of the primary gaseous product 37 prior to passing through the first outlet 32 is sufficient to entrain less than 0.5% (by wt.) of the char produced by the pyrolysis of the biomass feedstock. In certain embodiments, the upward local velocity of the primary gaseous product 37 prior to passing through the first outlet 32 is sufficient to entrain less than 0.1% (by wt.) of the char produced by the pyrolysis of the biomass feedstock. Achieving this low percentage of char carryover requires designing the height and diameter of the disengagement zone 45 to allow the terminal falling velocity of the char and heat carrier particles to exceed the upward local velocity of the primary gaseous product 37 exiting the first outlet 32. This results in nearly all char particles being retained in the pyrolysis reactor, thereby preventing these particles from contacting the upgrading catalyst.

Figure 2:
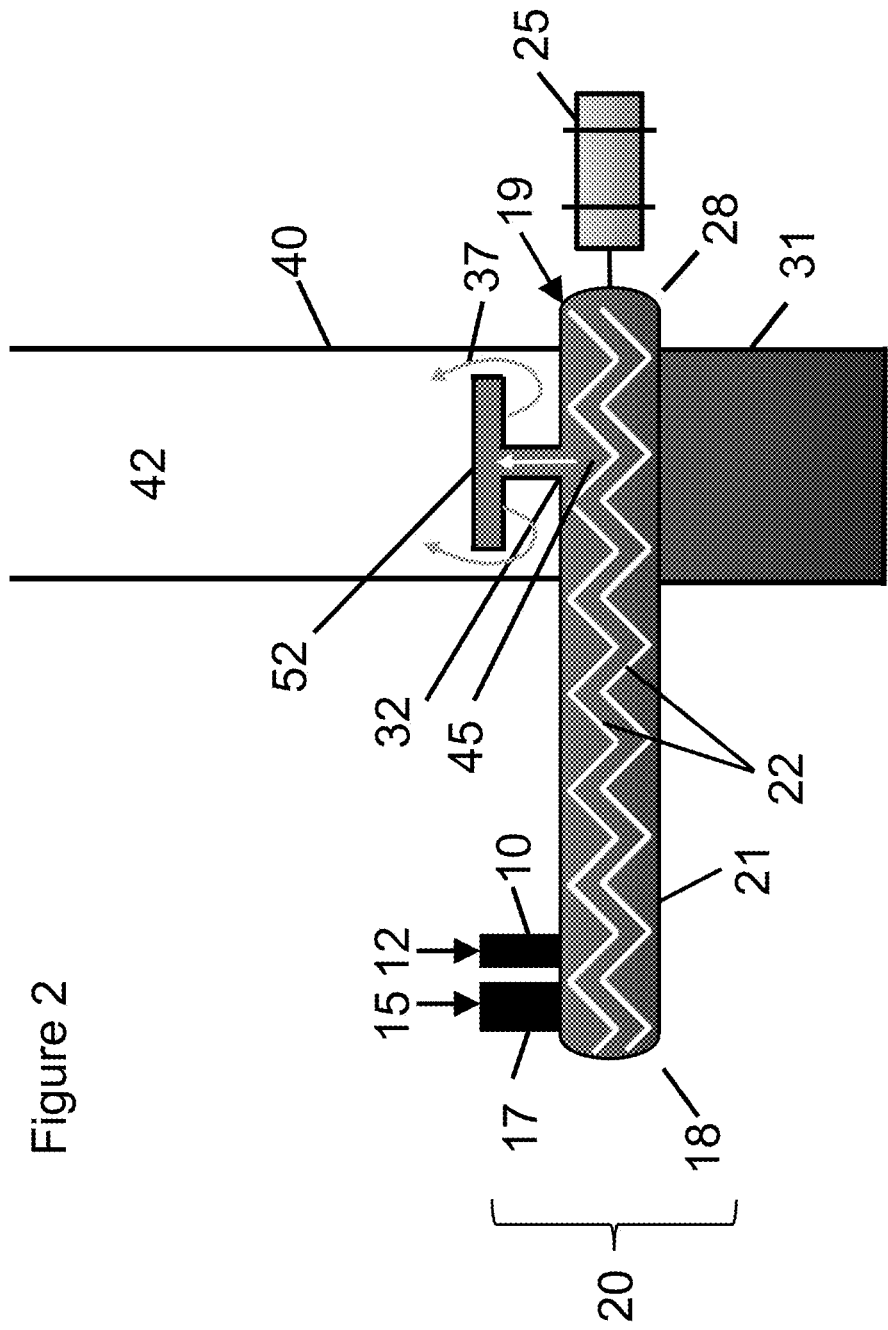
FIG. 2 is a simplified diagram of the inventive process depicting a pyrolysis reactor with a catalyst vessel to receive and upgrade the vapors from the pyrolysis reactor.
Figure 3:
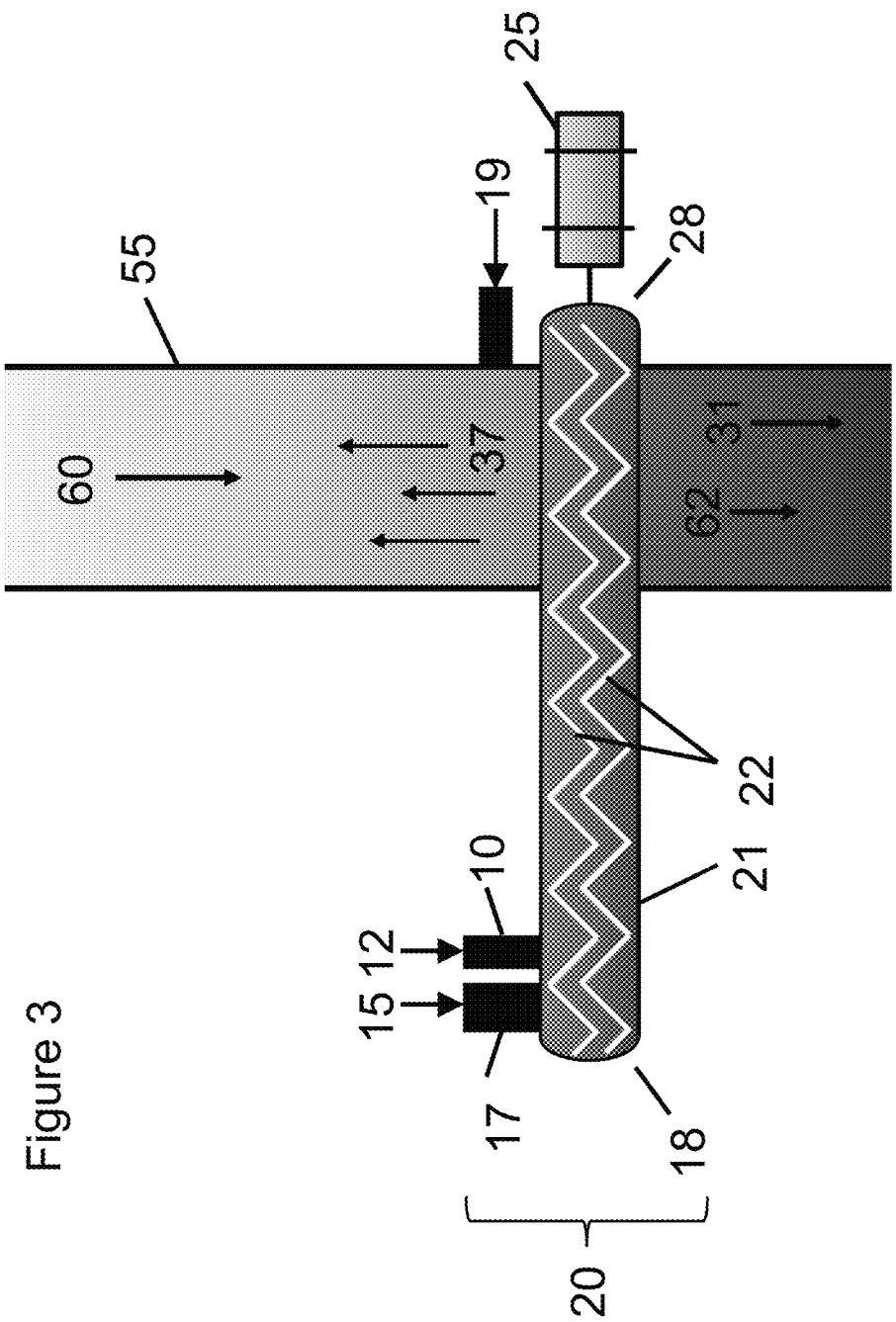
FIG. 3 is a simplified diagram of the inventive process depicting a pyrolysis reactor with a catalyst vessel to receive and upgrade the vapors from the pyrolysis reactor.

FIG. 2 depicts an alternative embodiment, wherein the disengagement zone 45 may be smaller (or not present) and residual char particles may be instead be removed by passing the primary gaseous product 37 through an upgrading reactor 40 comprising a fluidized bed. In yet another embodiment depicted in FIG. 3, the primary gaseous product 37 may rise through a reactor 55 comprising a moving bed granular filter that additionally comprises an initial upgrading catalyst 60. Optionally, the catalyst may migrate downward in counter-current flow against the rising gases, and char 31 and spent catalyst 62 would leave out the bottom of the reactor 20.

In certain embodiments, a sweep gas is employed that may comprise one or more of many gases that are either inert or reactive. For example, the sweep gas may comprise gases such as nitrogen, helium, argon, hydrogen, methane and mixtures thereof. If the sweep gas comprises a reactive gas, the reactive gas may optionally react with the biomass during pyrolysis, may serve as a reactant when the pyrolysis products are upgraded by contacting the upgrading catalyst (s), or both. The sweep gas may be injected into the system at more than one point, or injected simultaneously at multiple points. One point may comprise combining the sweep gas with the feedstock prior to entering the pyrolysis reactor, while another may comprise injecting sweep gas directly into the pyrolysis reactor proximal to the biomass feedstock inlet. A third point may comprise injecting the sweep gas proximal to the first outlet of the pyrolysis reactor. This may be preferable if the sweep gas is to be used as a reactant during upgrading of the primary gaseous product.

In certain embodiments, a gas may be injected just upstream of the pyrolysis reactor first outlet in order to 1) assist in preventing entrained char and heat carrier particles from leaving the pyrolysis reactor, 2) quench the primary gaseous product to a lower temperature, 3) heat the primary gaseous product to a higher temperature, or combinations thereof. In embodiments where the sweep gas serves to quench the primary gaseous product, such quenching may prevent coking. Embodiments where the sweep gas serves to heat the primary gaseous product may prevent formation of char and secondary pyrolysis reactions that may reduce the subsequent upgradability of the primary gaseous product to a bio-derived fuel. However, quenching is limited such that the quenched primary gaseous product does not condense prior to contacting the upgrading catalyst(s). Typically, this requires that the quenched primary gaseous product still maintains a temperature of at least 250° C. to prevent condensation.

The volumetric flow rate, or "standard gas hourly space velocity" (SGHSV) of the sweep gas is adjusted to minimize the time between pyrolysis and catalytic upgrading, such that the upgrading catalyst (or optionally, catalysts) contacts primary products of pyrolysis and not secondary pyrolysis products that comprise 16 or more carbons and are more difficult to upgrade to a bio-derived fuel. Volumetric flow rate for a given embodiment depends upon factors including, but not limited to, the volume of the pyrolysis reactor, the temperature and pressure at which the pyrolysis reactor is maintained, the feed rate of the biomass feedstock to the pyrolysis reactor, and the type of feedstock utilized. A paper by J. N. Brown, et al. provides one example of how these variables can be adjusted to determine an optimal volumetric flow rate for a desired pyrolysis outcome, including, for example, the pyrolysis liquid to pygas ratio, and the relative percentage of the feedstock converted to char.

The pressure maintained within the pyrolysis reactor is generally within a range of about 0 psig to 3000 psig. Preferably, the pyrolysis reactor is maintained at a pressure in the range of 100 psig to 500 psig to increase throughput of biomass feedstock, and in certain embodiments, facilitate catalytic upgrading of the primary gaseous product.

The primary gaseous product is driven by the sweep gas (or optionally, a pressure differential) from the pyrolysis reactor via the first outlet and enters an upgrading reactor and contacts an upgrading catalyst. Minimizing residence time of the primary gaseous product in the pyrolysis reactor is important for maximizing the percentage of primary gaseous product that is successfully upgraded to a bio-derived fuel. Conditions of temperature and pressure, as well as reactor dimensions are chosen to assure a residence time of the primary gaseous product in the pyrolysis reactor that is less than 5 seconds, preferably less than 3 seconds, more preferably less than 1 second, even more preferably less than 0.3 second, and most preferably less than 0.1 second.

Minimizing residence time of the primary gaseous product in the pyrolysis reactor prevents the occurrence of secondary pyrolysis reactions that form larger oxygenated species comprising 16 or more carbon atoms. These larger oxygenated species are likely to form coke, which is extremely detrimental to the process by fouling process equipment and heat carrier. Additionally, diversion of the primary gaseous product into secondary pyrolysis reactions decreases the conversion efficiency of the feedstock into smaller species that are more easily upgraded into a bio-derived fuel.

The physical distance between the pyrolyzer and the upgrading catalyst(s) contained within the upgrading reactor may vary, but is preferably minimized, taking into consideration the space velocity of the primary gaseous product (optionally in a mixture with a sweep gas) out of the pyrolysis reactor. Minimizing this distance assists in decreasing the time between production of the primary gaseous product and subsequent contacting with one or more upgrading catalyst(s). Through optimizing the variables of distance and space velocity, the current invention assures that the upgrading catalyst sees primary products from pyrolysis and not secondary products created by reactions occurring after pyrolysis. Generally, the distance between the pyrolyzer and the upgrading catalyst(s) is less than 4 ft. More preferably, this distance is less than 1 ft., and most preferably, less than 6 inches.

Optionally, the disengagement zone between the pyrolyzer and the upgrading catalyst may include additional features to limit reactivity of the primary gaseous product prior to contact with the upgrading catalyst(s). These may include (but are not limited to) temperature control, introduction of a gas or fluid to quench the primary gaseous product (as mentioned previously), flow control through judicious choices in geometry (preferably, a geometry minimizing bends and small orifices to decrease the potential for vapor condensation, the presence of a pre-catalyst (such as zeolite monolith, or any of the above-mentioned upgrading catalysts) at the interface between reactors.

In some embodiments, a catalyst monolith may be utilized as a pre-catalyst bed, or guard bed, while in other embodiments, the pre-catalyst may comprise a fluidized bed of catalyst integrated with the distributor assembly to control reactivity in this region. The fluidized bed of catalyst may additionally function as a moving bed filter to remove residual particulates. Such methods may be as described in U.S. Pat. No. 8,268,271, which is hereby incorporated by reference.

The at least one upgrading bed may utilize any type of reactor configuration including, but not limited to, a fixed bed, a bubbling bed, a circulating bed, a moving bed, a counter current reactor or combinations of one or more of these configurations. The catalyst may be periodically removed from the upgrading reactor and passed through a regenerator for de-coking as needed, then returned to the pyrolysis reactor. Optionally, fresh catalyst may be added on a periodic or continuous basis to the pyrolysis reactor to account for catalyst attrition. In certain embodiments, there may be no means of introducing fresh catalyst.

Examples of some upgrading catalysts and typical reaction conditions are disclosed in U.S. patent application Ser. No. 13/416,533, although any catalyst known to catalyze the conversion of primary gaseous products to a bio-derived fuel may be utilized. The catalyst may include, but is not limited to zeolites, metal modified zeolites, and other modified zeolites. Other catalysts may include forms of alumina, silica-alumina, and silica, unmodified or modified with various metals, not limited but including, Nickel, Cobalt, Molybdenum, Tungsten, Cerium, Praseodymium, Iron, Platinum, Palladium, Ruthenium and Copper or mixtures thereof. Still other catalysts may include unsupported metals, supported or unsupported metal oxides or metal phosphides, and mixtures thereof. Catalyst types include deoxygenation catalysts, hydrogenation catalysts, hydrotreating catalysts, hydrocracking catalysts, water-gas-shift catalysts and condensation catalysts. Catalyst(s) may be sulfided or un-sulfided. In certain embodiments, each catalyst bed may comprise mixtures of one or more catalysts of the types described above. Optionally, multiple catalyst beds may be placed within a single reactor, or multiple catalyst beds may be placed in different reactors to facilitate different reaction conditions. When multiple reactors are utilized, they may be arranged to either in parallel or series.

If multiple upgrading reactors are utilized, different conditions may be maintained in each reactor in order to facilitate a given catalytic reaction. To facilitate flow of the vapors through multiple reactors, a pressure differential may be maintained wherein the pressure in each successive reactor progressively decreases.

The residence time of the pyrolysis vapors in each upgrading reactor generally ranges from 0.01 sec to 1000 sec. Preferably, the residence time is in a range from 0.05 sec to 400 sec. More preferably, the residence time is in a range from 0.1 sec to 200 sec. Most preferably, the residence time is in a range from 0.1 sec to 100 sec.

The temperature maintained within each upgrading reactor is generally in the range from 72° F. to 1500° F. Preferably, the temperature is in the range from 100° F. to 1000° F., although if multiple upgrading reactors are used, each may be maintained at a different temperature within this range.

Certain upgrading reactions are advantageously conducted at a pressure that is greater than atmospheric pressure. The pressure that is maintained in the one or more upgrading reactors may range from 0-3000 psig, although a preferred pressure range is zero to 1000 psig. In certain embodiments, the pressure may range from 10 to 800 psig, from 20 to 650 psig, from 100 to 500 psig. An exemplary pressure might be 400 psig.

The flow of gas and vapors within each upgrading reactor is preferably upward, although downward or lateral gas flow may also be utilized. Upon exiting the final upgrading reactor, the upgraded gas and/or vapors are directed to a condensation system that functions to reduce the temperature of upgraded product vapors to a temperature that is at or below the dew point for at least one component. Typically, the conditions utilized do not result in the condensation of methane, but preferably will condense C4+ hydrocarbons. Hydrogen may be separated from the non-condensed gas by a variety of conventional methods and recycled as the sweep gas. In certain embodiments, the recycled hydrogen may be added directly into, or just upstream from, an upgrading reactor to facilitate one or more upgrading reactions. Alternatively, the entirety, or some fraction, of the bulk non-condensable gas is used for the same purpose. In another embodiment, the entirety, or some fraction, of the bulk of the non-condensable gas is sent to a combustor or hydrogen generation unit (e.g., a reformer) to generate either heat or hydrogen, respectively. The resulting heat or hydrogen may then be partially or entirely recycled back to the process.

The following examples of certain embodiments of the invention are given. Each example is provided by way of explanation of the invention, and are intended to be illustrative of specific embodiments. The following examples should not be interpreted to limit, or define, the scope of the invention in any way.

EXAMPLE 1

Kiln-dried Red Oak was ground and the particles were subjected to pyrolysis ("Raw Biomass" in Table 1) or pre-sized into two fractions with a particle diameter ranging from of 300 to 500 microns ("300-500 µM" in Table 1) or a particle size ranging from 750 to 1250 microns ("750-1250 µM" in Table 1).

Biomass was added to a pyrolysis reactor with a heat carrier heated to a temperature greater than about 1200° F. to thermally decompose solid biomass to condensable pyrolysis vapors, char, and non-condensable gases. The pyrolysis vapors (primary gaseous product) passed out of the pyrolysis reactor and was cooled and collected in a collection system comprised of electrostatic precipitators (ESPs). These ESP collected vapors that condensed at greater than about 180° F., while water-cooled condensers collected vapors that condense at a temperature of less than 180° F.

In the experiment, solids remained in the pyrolysis reactor (Table 1) and two fractions were collected (refer to Tables 2 and 3, respectively: 1). The vapor-gas stream was cooled from 850° F. to 320° F. The condensed liquid droplets and aerosols were then collected in an ESP. This fraction consisted primarily of anhydrosugars, oligosaccharides, and phenolic oligomers. 2). Sub-cooled nitrogen further cooled the vapor stream to 180° F. at the entry to a second ESP. The condensed liquid droplets were collected. This fraction contains mainly phenolic and furanic species. The temperature chosen minimized water condensation while still effectively condensing phenols and furans.

Following collection, pyrolysis oils and biochar were analyzed by inductively coupled plasma (ICP) for metal content. Solid weight fraction was estimated by comparing the amount of potassium and calcium in the pyrolysis oil to the amount of Ca and K per unit weight of biochar. Biochar was assumed to be the only solid found in the pyrolysis oils and the only source of Ca and K. This assumption was made because the Ca/K ratio for biomass, biochar, and the oils was substantially similar.

The data shows that upon the pyrolysis of red oak, metals derived from the feedstock are largely retained in the solids fraction (Table 1). When the feedstock was sized to a particle diameter ranging from 300-500 microns (second column), total metal content in the resulting pyrolysis oil fractions decreased by 94% in the first fraction (Table 2 second column) and by 97% in the second pyrolysis oil fraction (Table 2 second column) relative to the content detected in the feedstock (Table 1, column 1). Detected metal content was 16-fold higher in the solids fraction (Table 1, second column) versus the feedstock (Table 1, first column). Similarly, when the feedstock was sized to a particle diameter ranging from 750-1250 microns (Tables 1-3, third column), total metal content detected in the resulting pyrolysis oil fractions (Tables 2 and 3) decreased even further (95-99%, respectively) relative to the metal content found in the feedstock (Table 1, first column), while detected metal content was 8-fold higher in the solids fraction (Table 1, third column) versus the metal content detected in the feedstock (Table 1, first column).

TABLE 1

Metal Content of Solids, wt ppm

| Red Oak | Raw Biomass Jan. 26, 2011 | Pyrolytic Char (300 to 500 μm) Jan. 18, 2011 | Pyrolytic Char (750 to 1250 μm) Jan. 26, 2011 |
|---|---|---|---|
| Al | 1.51 | 208 | 18.0 |
| As | <20.2 | <20.1 | <20.3 |
| B | <5.14 | 19.5 | 11.8 |
| Ba | 8.19 | 152 | 44.2 |
| Ca | 785 | 5300 | 4390 |
| Cd | <2.06 | <2.04 | <2.07 |
| Co | <2.20 | 3.61 | <2.21 |
| Cr | <4.52 | 451 | 32.0 |
| Cu | <1.10 | 57.7 | 17.9 |
| Fe | 108 | 14500 | 4820 |
| K | 587 | 3600 | 3150 |
| Li | <1.06 | <1.05 | <1.07 |
| Mg | 36.7 | 820 | 258 |
| Mn | 35.7 | 321 | 254 |
| Mo | <3.15 | 19.2 | 4.32 |
| Na | 10.7 | 389 | 89.4 |
| Ni | <2.09 | 192 | 19.6 |
| P | 17.3 | 332 | 85.2 |
| Pb | <15.5 | <15.4 | <15.6 |
| Sb | <7.11 | <7.05 | <7.14 |
| Sn | <1.30 | <1.29 | 6.43 |
| Sr | 5.16 | 35.7 | 27.7 |
| Ti | <2.08 | 46.2 | <2.09 |
| V | <4.09 | <4.06 | <4.11 |
| Zn | 0.915 | 39.6 | 7.49 |
| Zr | <1.53 | <1.52 | <1.54 |
| Detected | 1596 | 26467 | 13236 |

TABLE 2

Metal Content of Pyrolysis Oil - Fraction 1, wt ppm

| Red Oak Oil Particle Size | Jan. 18, 2011 300-500 micron | Jan. 26, 2011 750-1250 micron |
|---|---|---|
| Al | 1.67 | <0.560 |
| As | <20.1 | — |
| B | <5.11 | <5.35 |
| Ba | <3.01 | <3.15 |
| Ca | 25.5 | 1.86 |
| Cd | <2.05 | <2.14 |
| Co | <2.19 | <2.29 |
| Cr | <4.50 | <4.71 |
| Cu | <1.07 | <1.12 |
| Fe | 59.3 | 22.7 |
| K | <28.9 | <30.2 |
| Li | <1.06 | <1.11 |
| Mg | 4.13 | <1.34 |
| Mn | 1.27 | <0.315 |
| Mo | <3.13 | <3.28 |
| Na | 10.5 | 8.46 |
| Ni | <2.08 | <2.17 |
| P | <7.07 | <7.41 |
| Pb | <15.4 | — |
| Sb | <7.07 | — |
| Sn | <1.30 | — |
| Sr | <0.263 | <0.276 |
| Ti | <2.07 | <2.16 |
| V | <4.07 | <4.26 |
| Zn | <0.443 | <0.464 |
| Zr | <1.52 | <1.59 |
| Detected | 102.4 | 33.0 |
| Solids Estimate | 0.48% | 0.042% |

TABLE 3

Metal Content of Pyrolysis Oil - Fraction 2, wt ppm

| Red Oak Oil Particle Size | Jan. 18, 2011 300-500 micron | Jan. 26, 2011 750-1250 micron |
|---|---|---|
| Al | 1.18 | <0.533 |
| As | <20.0 | — |
| B | <5.09 | <5.09 |
| Ba | <3.00 | <3.00 |
| Ca | 35.2 | 2.47 |
| Cd | <2.04 | <2.04 |
| Co | <2.18 | <2.18 |
| Cr | <4.48 | <4.48 |
| Cu | <1.07 | 1.28 |
| Fe | 9.45 | 10.4 |
| K | <28.7 | <28.8 |
| Li | <1.05 | <1.05 |
| Mg | <1.28 | <1.28 |
| Mn | <0.300 | <0.300 |
| Mo | <3.12 | <3.12 |
| Na | <7.35 | <7.36 |
| Ni | <2.07 | <2.07 |
| P | <7.04 | <7.05 |
| Pb | <15.4 | — |
| Sb | <7.04 | — |
| Sn | <1.29 | — |
| Sr | <0.262 | <0.262 |
| Ti | <2.06 | <2.06 |
| V | <4.05 | <4.06 |
| Zn | 9.80 | <0.441 |
| Zr | <1.52 | <1.52 |
| Detected | 55.6 | 14.2 |
| Solids Estimate | 0.66% | 0.056% |

DEFINITIONS

As used herein, the term "entrainment" is defined as transport of a solid particle by a gas stream. Entrainment of a given solid particle typically occurs when the local velocity of a gas stream exceeds the terminal falling velocity of the particle.

As used herein, the term "standard gas hourly space velocity" or "SGHSV" refers to the gas hourly space velocity of a gas stream measured at standard conditions.

In closing, it should be noted that the discussion of any reference is not an admission that it is prior art to the present disclosure, in particular, any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:

1. Brown, J. N., et al. "Process Optimization of an Auger Pyrolyzer with Heat Carrier Using Response Surface Methodology." Biores. Tech. 103:405-4141 (2012).

The invention claimed is:

1. A biomass pyrolysis process, comprising the steps of:
   (a) sizing a biomass feedstock to consist of particles having a diameter ranging from 300 microns to 500 microns;
   (b) pyrolyzing the biomass feedstock in a reactor for a residence time of less than 5 seconds, wherein the pyrolyzing forms products comprising a primary gaseous product and char;
   (c) passing the primary gaseous product out of the reactor, and condensing the primary gaseous product to produce a pyrolysis oil that is characterized by a total metal content (in ppm) that is six percent or less of the total metal content (in ppm) of the biomass feedstock.

* * * * *